(12) United States Patent
Princell et al.

(10) Patent No.: US 8,186,388 B2
(45) Date of Patent: May 29, 2012

(54) COMPOSITE INSULATION STRUCTURE FOR THE INSULATION OF THE INTERIOR SURFACE OF ANNULAR DUCTS

(75) Inventors: Charles M. Princell, Graham, NC (US); Bruce Althouse, Graham, NC (US)

(73) Assignee: Armacell Enterprise GmbH, Muenster (DE)

( * ) Notice: Subject to any disclaimer, the term of this patent is extended or adjusted under 35 U.S.C. 154(b) by 917 days.

(21) Appl. No.: 12/236,926

(22) Filed: Sep. 24, 2008

(65) Prior Publication Data

US 2010/0018601 A1 Jan. 28, 2010

Related U.S. Application Data

(60) Provisional application No. 61/083,779, filed on Jul. 25, 2008.

(30) Foreign Application Priority Data

Aug. 29, 2008 (EP) .................................... 08015316

(51) Int. Cl.
*F16L 9/14* (2006.01)

(52) U.S. Cl. ...... 138/149; 138/141; 138/137; 428/36.91

(58) Field of Classification Search ................... 138/149, 138/137, 140, 141; 428/36.91
See application file for complete search history.

(56) References Cited

U.S. PATENT DOCUMENTS

| | | | | |
|---|---|---|---|---|
| 4,768,562 A * | 9/1988 | Strand | ............................. | 138/98 |
| 5,042,532 A * | 8/1991 | Gilleland | ......................... | 138/98 |
| 5,873,391 A * | 2/1999 | Kittson et al. | ................... | 138/98 |
| 5,911,246 A * | 6/1999 | Kittson et al. | ................... | 138/98 |
| 5,931,199 A * | 8/1999 | Kittson et al. | ................... | 138/98 |
| 5,947,158 A | 9/1999 | Gross et al. | ..................... | 138/149 |
| 5,971,030 A * | 10/1999 | Maimets | ......................... | 138/98 |
| 2003/0234058 A1 * | 12/2003 | Tippins | ......................... | 138/149 |

FOREIGN PATENT DOCUMENTS

FR 2832487 A1 5/2003
WO 2005014258 A 2/2005

* cited by examiner

*Primary Examiner* — Patrick F Brinson

(74) *Attorney, Agent, or Firm* — Rothwell, Figg, Ernst & Manbeck, P.C.

(57) ABSTRACT

A flexible, composite duct insulation structure includes a first layer forming an insulation layer, and a second layer forming a structural support layer. The first layer is adhered to the second layer by an adhesive. The composite duct insulation structure has sufficient strength and radially outward-directed spring force of the structure alone so as to press and hold the insulation structure against the interior wall of a tubular duct without additional spring structure or retaining structure.

18 Claims, 2 Drawing Sheets

US 8,186,388 B2

COMPOSITE INSULATION STRUCTURE FOR THE INSULATION OF THE INTERIOR SURFACE OF ANNULAR DUCTS

CROSS-REFERENCE TO RELATED APPLICATION(S)

This application claims the benefit of U.S. Provisional Application No. 61/083,779, filed Jul. 25, 2008 and also claims priority from European Patent Application No. 08 015 316.6, filed Aug. 29, 2008, the disclosure of which is incorporated herein in its entirety by reference.

BACKGROUND OF THE INVENTION

1. Field of the Invention

This invention relates to insulation structures and methods for the insulation of interior surfaces of annular ducts.

2. Description of the Background Art

Current application of low density thermal and/or acoustic insulation to the interior surface of annular duct systems typically requires a three component structure: (1) annular duct shell, (2) low density fiber, such as fiberglass, and (3) annular (perforated or solid) insulated retaining insert. (see FIG. 5). The purpose of the retaining insert is to hold the insulation material against the interior wall of the annular duct. Fiberglass insulation materials do not have sufficient structural integrity to maintain an unaided annular shape, and cannot be installed in annular ducts without the use of strong adhesives, mechanical fasteners and/or annular retaining inserts. The use of limited open time contact adhesives is prohibitive due to health hazards and surface area application limits associated with short setup time. The installation of metal retaining inserts is costly, requires special safety equipment and practices, reduces the NRC (noise reduction coefficient) of the installed insulation, and increases the installed weight of the duct sections by ⅓ or greater.

Prior attempts to replace fiberglass with closed cell elastomer and polymer foams have all resulted in failure. Closed cell foams are extremely difficult to install between the duct shell and insulation retaining insert due to the magnitude of the resulting insertion force.

There remains a need in the art for improved insulation structures and methods for the insulation of interior surfaces of annular ducts.

SUMMARY OF THE INVENTION

In accordance with one embodiment of the invention, a flexible, composite duct insulation comprises a first layer forming an insulation layer, and a second layer forming a structural support layer. The first layer is adhered to the second layer by an adhesive. The composite duct insulation structure has sufficient strength and radially outward-directed spring force to press and hold the composite duct insulation outwardly against an inner annular surface wall of a tubular duct without additional spring structure or retaining structure.

DETAILED DESCRIPTION OF THE INVENTION

In accordance with one embodiment, the present invention provides a composite insulation structure that improves the NRC characteristics of the installed insulation structure, reduces or eliminates safety and health hazards associated with current insulation installation practices, and reduces the duct section weight compared to prior art insulation structures.

In one embodiment, a low-density annular duct insulation system comprises a layered composite structure that can be formed into an annular configuration and easily installed and held securely in place to the interior wall of an annular duct, through radially outward-directed force of the insulation structure alone. In accordance with one embodiment, the present invention forms an effective vapor barrier.

In another embodiment, the composite insulation can also be fixed in place using non-hazardous, peel and seal pressure-sensitive adhesive fasteners.

The mechanical structure of the composite insulation system can be easily cut to meet the dimensional requirements of a wide range of duct shapes and sizes. The composite can be cut without special cutting tools.

The present invention provides a composite duct insulation comprising of an insulation layer and a structural support layer. The first layer is adhered to the second layer by an adhesive to form a composite structure. This composite insulation structure has sufficient strength and radially outward-directed spring force to press the composite duct insulation outwardly against an inner annular surface wall of a tubular duct (e.g., a substantially horizontal tubular duct) without additional spring structure or retaining structure.

The spring force required to prevent the composite insulation sleeve structure from collapsing on itself is that required to overcome gravity. This is dependent on the density and thickness of the composite being used and the diameter of the duct being insulated, and can easily be determined by persons skilled in the art. The actual force will change depending on the cut length of the composite piece being formed to an annular shape and inserted into the duct shell. Due to the compression characteristics of various composites, with certain composites, cut pieces of a length greater than the duct circumference may be installed, in which case the applied force is determined by cut length of the piece being installed. In preferred embodiments, the installed foam insulation composite retains its' annular shape without the necessity of cutting lengths greater than the minimum specified manufacturing circumference of the receiving duct shell.

Figure 1:
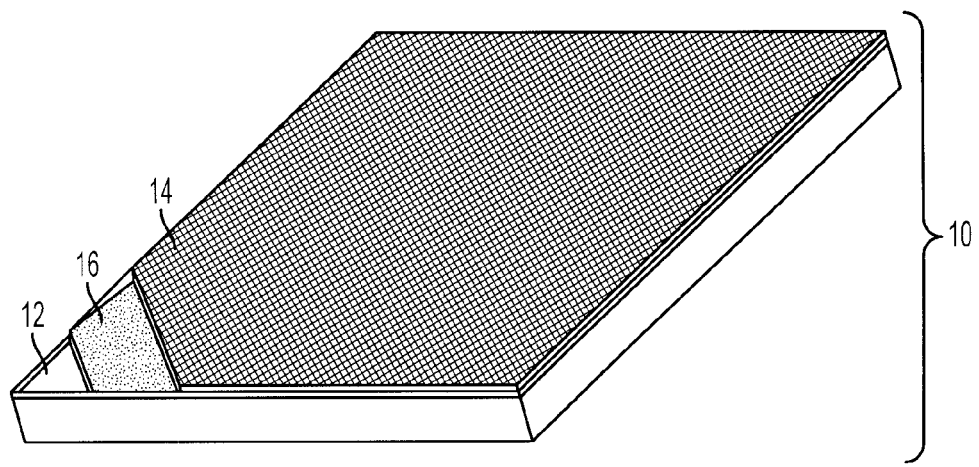
FIG. 1 is a perspective view of one embodiment showing layers of a composite insulation system.

As illustrated in FIG. 1 the composite insulation structure 10 of the invention comprises a first outer layer 12 of insulation material and a second inner layer 14 providing structural support. The first layer 12 is adhered to the second layer by an adhesive 16. The insulation layer 12 can be formed from any material suitable for insulating ducts, preferably elastomeric foams, thermoplastic foams, thermo-set polymer foams, and fiber insulation materials.

Open- or closed-cell type elastomeric foams, and preferably cross-linked foams are used for the insulation layer 12. Any suitable elastomeric foam materials can be used, including but not limited to, Ethylene-propylene (EPDM), Nitrile (NBR), Styrene-butadiene (SBR), Polybutadiene (BR), Natural rubber (NR), Chloroprene (CR), Butyl and Halobutyl (IIR, BIIR, CIIR), Silicone (MQ), Blends with compatible rubbers, e.g. Styrene-butadiene and polybutadiene, Blends with compatible resins, e.g., Nitrile and polyvinyl chloride.

In another embodiment, the insulation layer 12 is formed from a thermoplastic foam, preferably cross-linked polyethylene, non-cross-linked polyethylene, polypropylene, polyvinylchloride, polyethylene terephthalate, or polyurethane.

In another embodiment, the insulation layer 12 may be formed from fiber insulation material, preferably fiberglass, organic fibers, or a combination thereof.

In another embodiment, the insulation layer 12 may be formed from an organic fiber, preferably cotton, polyester, or a combination thereof.

The insulation layer thickness may be from about 0.05 inch to 5 inches, preferably about 0.5 inch to 3 inches.

The structural support layer 14 is preferably a spring-flex support layer and is formed from thermo plastic foams, thermo-set polymer foams, or corrugated metals, or other sheet metals that demonstrate radially outward-directed spring force.

In one embodiment, the structural support layer 14 is formed from a thermo plastic foam, preferably cross-linked or non-cross linked polyethylene, polypropylene, polyvinylchloride, polyethylene terephthalate, or polyurethane.

In another embodiment, the structural support layer 14 is formed from a corrugated metal, preferably aluminum, galvanized steel, or tin.

The support layer thickness may be from about 0.02 inch to 1 inch, preferably about 0.05 inch to 0.375 inch.

The insulation layer 12 is bound to at least the inner structural support layer using any suitable adhesive 16 for adhering insulating materials. Preferably, the adhesive 16 is contact- or pressure-sensitive adhesive, more preferably hotmelt pressure sensitive adhesive. The adhesive 16 may be acrylic hydrocarbon solvent-based or water-based.

The adhesive thickness may be from about 0.001 inch to 0.075 inch, preferably about 0.002 inch to 0.015 inch.

Figure 2:
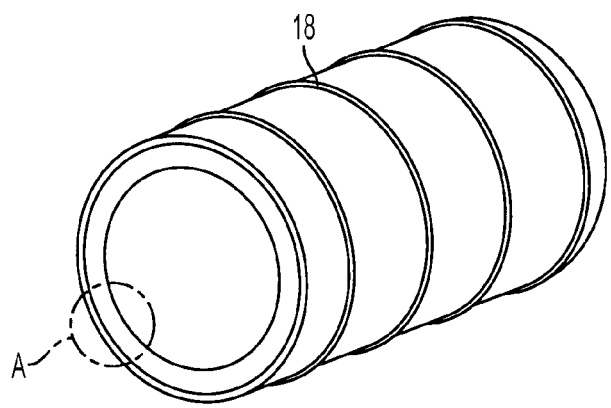
FIG. 2 is a perspective end view of one embodiment showing the configuration of the composite insulation system in a substantially annular duct.

The composite duct insulation structure has sufficient strength and radially outward-directed spring force to press the composite duct insulation structure 10 outwardly against an inner annular surface wall of a tubular duct 18 without additional spring structure or retaining structure. The composite duct insulation structure 10 can be positioned within an annular duct 18 as shown in FIG. 2.

In accordance with one embodiment, the insulation is secured to the interior wall of a duct by radially outward-directed spring force which can be increased or decreased by altering the circumference of the composite insulation structure 10. This invention eliminates the need to inventory multiple sizes of rigid pre-formed insulation or fabricated metal insulation retaining inserts. Thus, because the present invention can be easily cut to size in any location, it can be used to insulate any size duct without manufacturing custom sized structural inserts or pre-formed insulation, and without the use of specialized cutting tools.

In one embodiment, the insulation layer 12 is oriented inwardly toward the center of an annular duct, and the structural support layer 14 is oriented outwardly toward the inner annular surface wall of tubular duct 18.

In another embodiment, insulation layer 12 is oriented outwardly toward the inner annular surface wall of a tubular duct 18, and the structural support layer 14 is oriented inwardly toward the center of duct 18.

Figure 4:
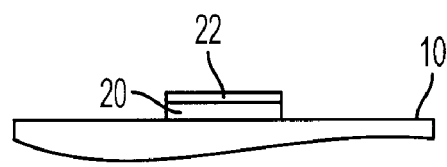
FIG. 4 is a schematic view of one embodiment showing adhesive strips.
Figure 5:
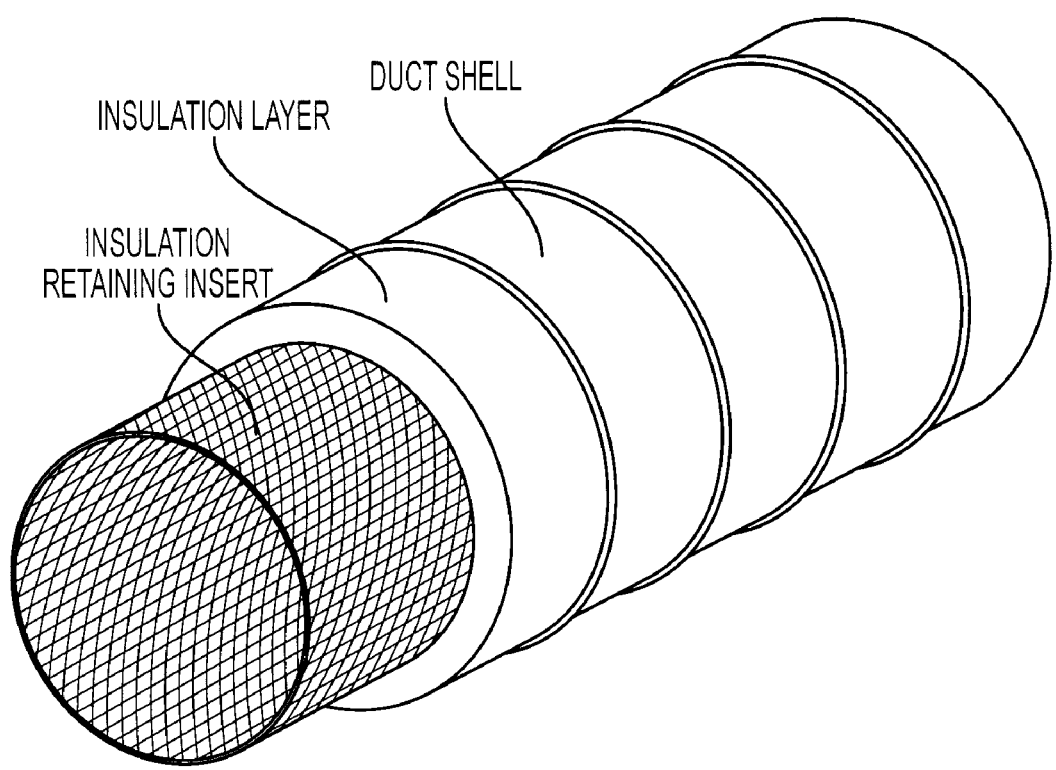
FIG. 5 is a perspective expanded end view of prior annular duct insulation systems.

In another embodiment, the composite insulation structure 10 can be fixed to the interior wall of a duct 18 using adhesive strips 20 disposed on the outer layer of the composite duct insulation structure. (see FIG. 4) The adhesive strips 20 may be contact- or pressure-sensitive adhesive, preferably hotmelt pressure sensitive adhesive, covered by release liners 22. The adhesive may be acrylic hydrocarbon solvent-based or water-based. Once the composite insulation structure 10 is in position, the release liners 22 are peeled off to expose an adhesive surface on the adhesive strips 20 on the outer layer of the composite duct insulation structure 10. Thus, this adhesive surface 20 of the composite duct insulation structure 10 can be contacted to the interior wall of an annular duct 18 to adhere the composite insulation to the duct wall.

The invention further comprises methods for attaching said composite insulation structure 10 to the interior wall of a duct 20. The method comprises 1) cutting the duct insulation structure, 2) rolling said duct insulation into an annular shape, and 3) positioning the annular shaped insulation against an interior wall of a duct by radially outward-directed spring force of the structure alone so as to press and hold the insulation structure against the interior wall of a tubular duct without additional spring structure or retaining structure. The duct insulation system is cut to a suitable size, and has sufficient spring force to press the composite duct insulation outwardly against an inner annular surface wall of a tubular duct without additional spring structure or retaining structure.

In another embodiment, the composite insulation structure 10 can be adhered to the interior wall of a duct 18 by cutting the duct insulation (having outwardly-directed adhesive strips with release liners) to a desired size, rolling the duct insulation into an annular shape, peeling off release liners, and securing the annular shaped insulation to an interior wall of a duct by contacting said exposed adhesive strips to said interior duct wall.

Figure 3:
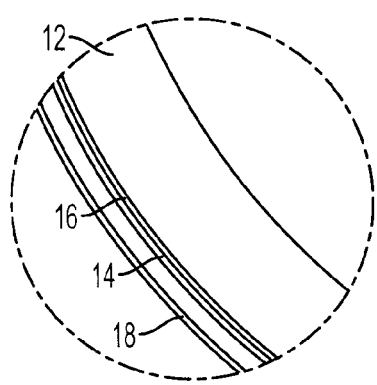
FIG. 3 is a detailed cross-sectional view of section A of the end view of FIG. 2.

While the composite insulation structure 10 of FIGS. 1, 2, and 3 only show one insulation layer 12 and one structural support layer 14, additional layers and coatings may be included in the composite insulation structure.

In describing the invention, certain embodiments have been used to describe the invention. However, the invention is not limited to these embodiments as other embodiments of the present invention will readily occur to those skilled in the art after reading this specification.

We claim:

1. A flexible, composite duct insulation structure comprising:
 a first layer forming an insulation layer;
 a second layer forming a structural support layer;
 a middle layer forming an adhesive layer;
 the first layer being adhered to the second layer by the middle adhesive layer;
 the composite duct insulation structure having sufficient strength and radially outward-directed spring force in the composite structure alone to press the composite duct insulation outwardly against an inner annular surface wall of a tubular duct without additional spring structure or retaining structure.

2. The duct insulation of claim 1, wherein said insulation layer is formed from a material selected from the group consisting of elastomeric foams, thermo plastic foams, thermo-set polymer foams, and fiber insulation materials.

3. The duct insulation of claim 2, wherein said elastomeric foams are cross-linked.

4. The duct insulation of claim 2, wherein said elastomeric foams are of open- or closed-cell type.

5. The duct insulation of claim 3, wherein said elastomeric foam is selected from the group consisting of Ethylene-propylene (EPDM), Nitrile (NBR), Styrene-butadiene (SBR), Polybutadiene (BR), Natural rubber (NR), Chloroprene (CR), Butyl and Halobutyl (IIR, BIIR, CIIR), Silicone (MQ), Blends with compatible rubbers, eg. Styrene-butadiene and polybutadiene, Blends with compatible resins, eg., Nitrile and polyvinyl chloride.

6. The duct insulation of claim 2, wherein said thermo plastic foam is selected from the group consisting of cross-linked polyethylene, non-cross-linked polyethylene, polypropylene, polyvinylchloride, polyethylene terephthalate, and polyurethane.

7. The duct insulation of claim 2, wherein said fiber insulation material is selected from the group consisting of fiberglass, organic fibers, or a combination thereof.

8. The duct insulation of claim 7, wherein said organic fiber is selected from the group consisting of cotton, polyester, or a combination thereof.

9. The duct insulation of claim 1, wherein said structural support layer is a spring-flex support layer.

10. The duct insulation of claim 1, wherein said structural support layer is formed from a material selected from the group consisting of thermo plastic foams, thermo-set polymer foams, and sheet metals.

11. The duct insulation of claim 10, wherein said foams are cross-linked or non-cross linked polyethylene, polypropylene, polyvinylchloride, polyethylene terephthalate, or polyurethane.

12. The duct insulation of claim 10, wherein said sheet metals are selected from the group consisting of aluminum, steel, and tin.

13. The duct insulation of claim 1, wherein when said insulation is formed into an annular shape, said insulation layer comprises an inner layer, said adhesive comprises a middle layer, and said support layer comprises an outer layer.

14. The duct insulation of claim 13, further comprising adhesive strips, wherein said adhesive strips are disposed on said outer layer.

15. The duct insulation of claim 14, wherein said outer adhesive strips are covered by release liners, wherein said release liner can be peeled off said adhesive strips to expose an adhesive surface on said outer layer.

16. The duct insulation of claim 1, wherein said insulation layer thickness is about 0.05 inch to 5 inches.

17. The duct insulation of claim 1, wherein said adhesive thickness is about 0.001 inch to 0.075 inch.

18. The duct insulation of claim 1, wherein said support layer thickness is 0.02 inch to 1 inch.

* * * * *